Feb. 22, 1966　　　　　M. GREEN　　　　　3,236,331
WORK BENCH, SCAFFOLD AND LIFT COMBINATION
Filed May 29, 1963　　　　　　　　　　16 Sheets-Sheet 1

MARTIN GREEN
INVENTOR.

BY George B. Oujevolk

ATTORNEY

Feb. 22, 1966          M. GREEN          3,236,331
WORK BENCH, SCAFFOLD AND LIFT COMBINATION
Filed May 29, 1963                16 Sheets-Sheet 2
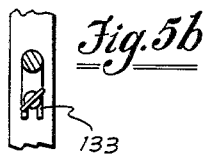
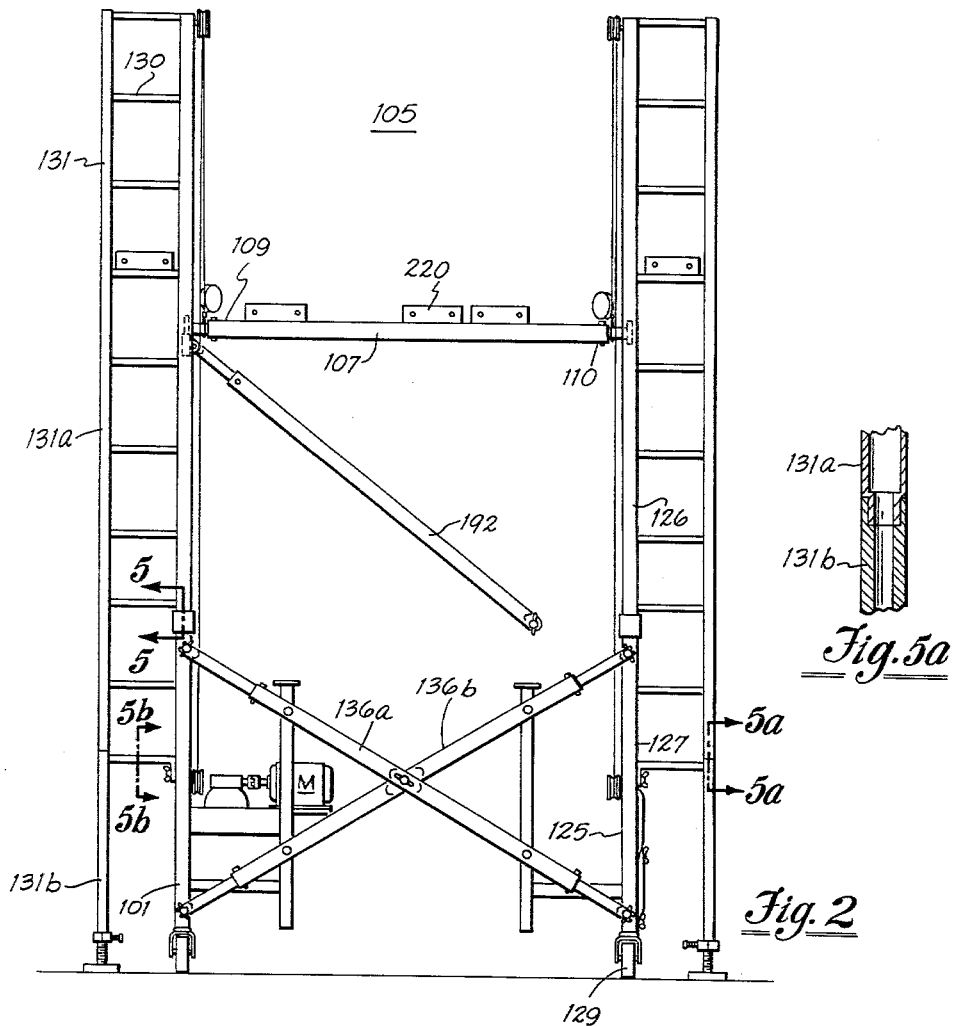
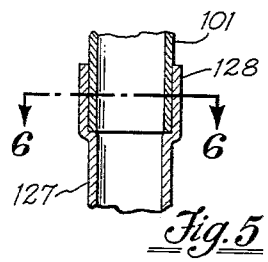
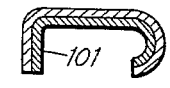
MARTIN GREEN
INVENTOR.
BY George B. Oujevolk
ATTORNEY

MARTIN GREEN
INVENTOR.

BY George B. Oujevolk
ATTORNEY

Feb. 22, 1966   M. GREEN   3,236,331
WORK BENCH, SCAFFOLD AND LIFT COMBINATION
Filed May 29, 1963   16 Sheets-Sheet 4
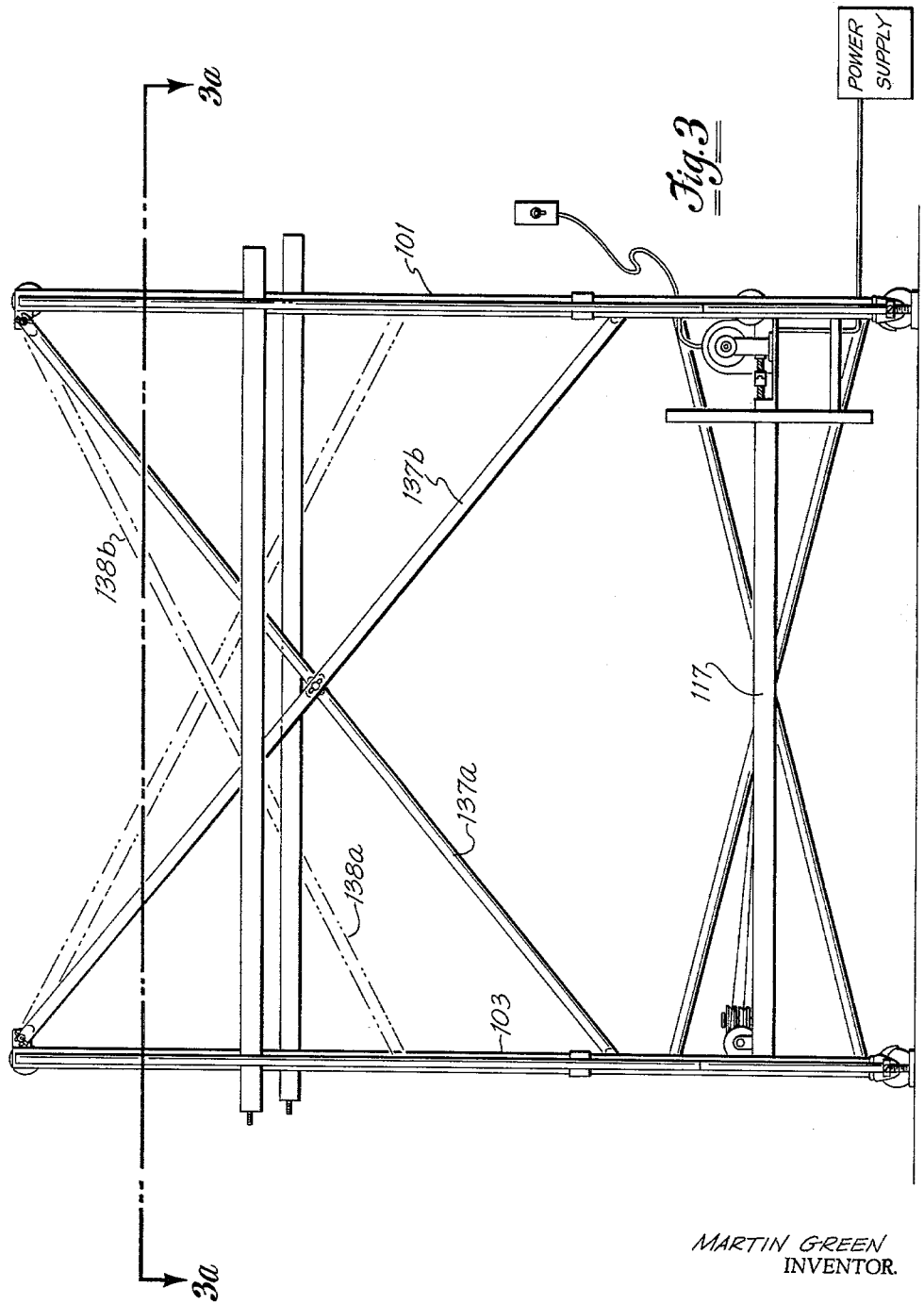
MARTIN GREEN
INVENTOR.
BY George B. Oujevolk
ATTORNEY

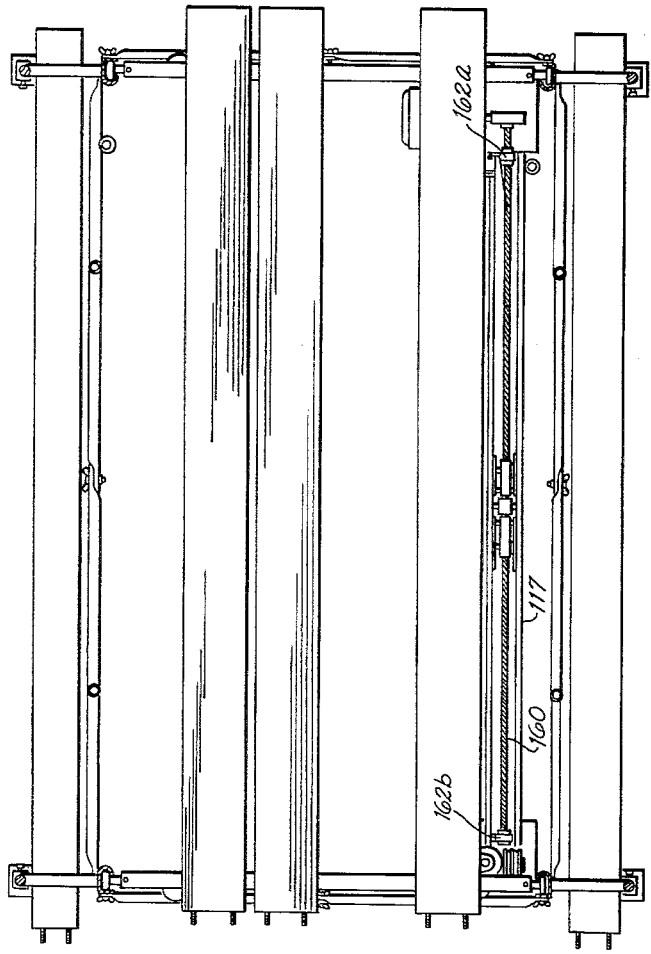

Feb. 22, 1966  M. GREEN  3,236,331
WORK BENCH, SCAFFOLD AND LIFT COMBINATION
Filed May 29, 1963  16 Sheets-Sheet 6

MARTIN GREEN
INVENTOR.

BY George B. Oujevolk
ATTORNEY

Feb. 22, 1966 M. GREEN 3,236,331
WORK BENCH, SCAFFOLD AND LIFT COMBINATION
Filed May 29, 1963 16 Sheets-Sheet 7
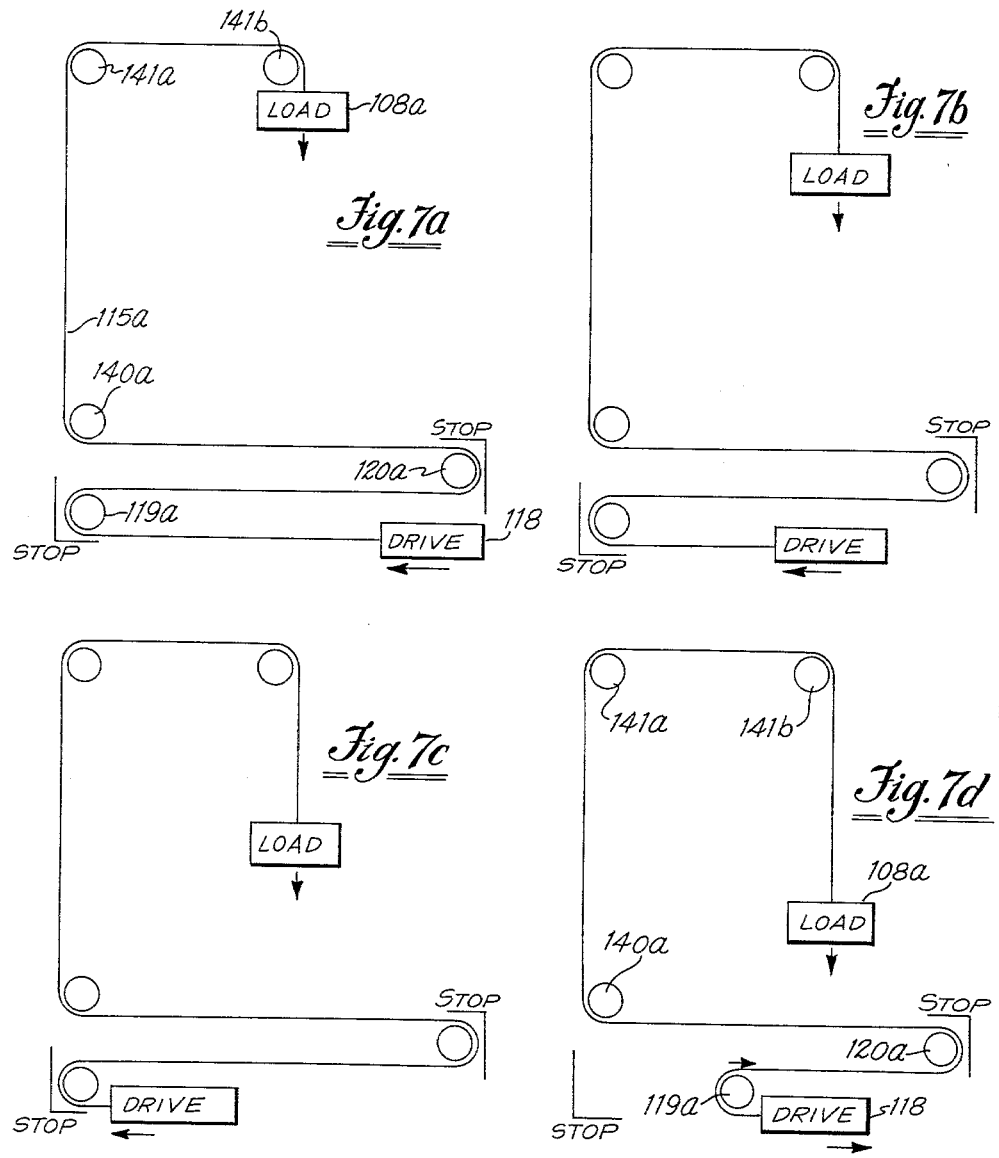
MARTIN GREEN
INVENTOR.
BY George B. Oujevolk
ATTORNEY Feb. 22, 1966 M. GREEN 3,236,331
WORK BENCH, SCAFFOLD AND LIFT COMBINATION
Filed May 29, 1963 16 Sheets-Sheet 8
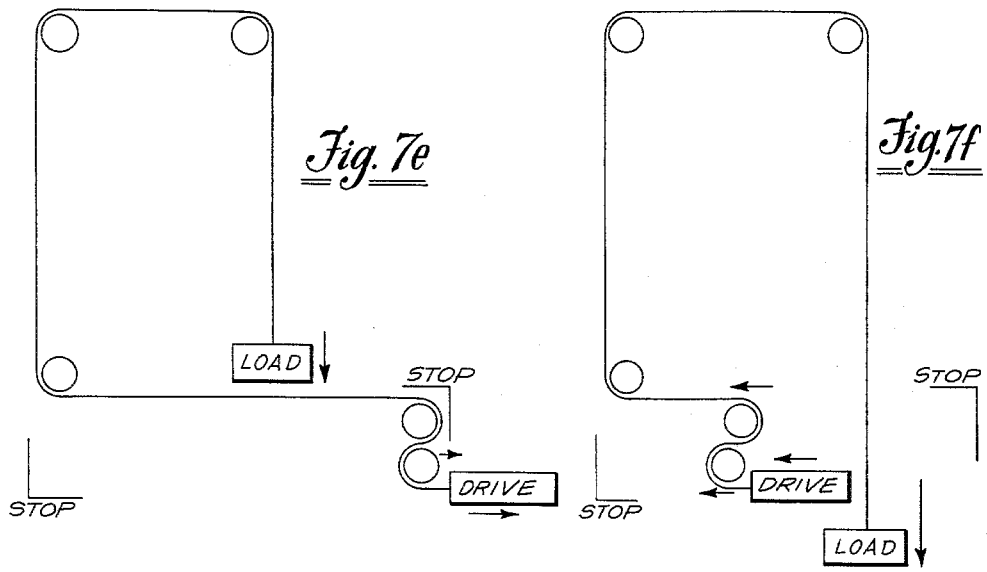
MARTIN GREEN
INVENTOR.
BY George B. Oujevolk
ATTORNEY

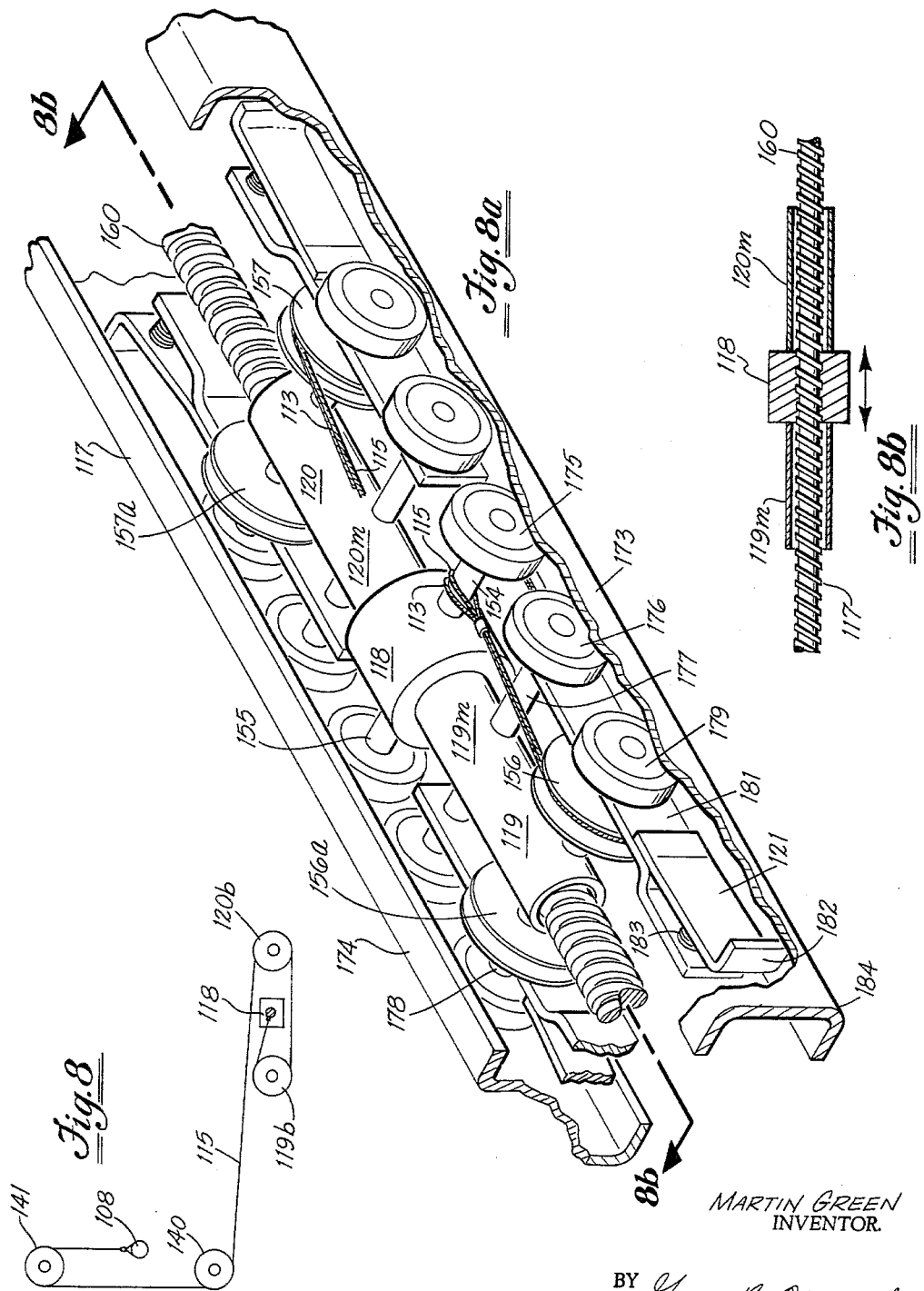

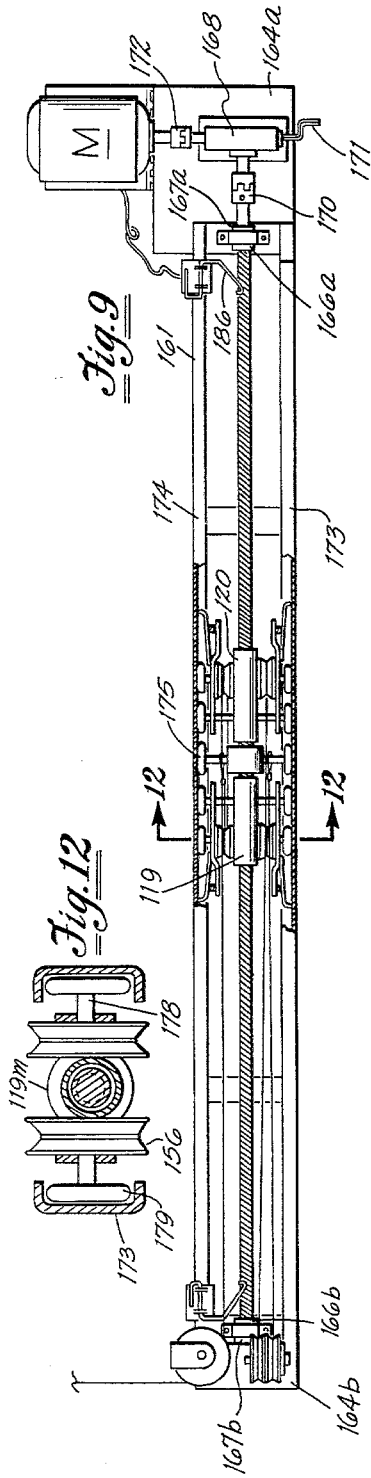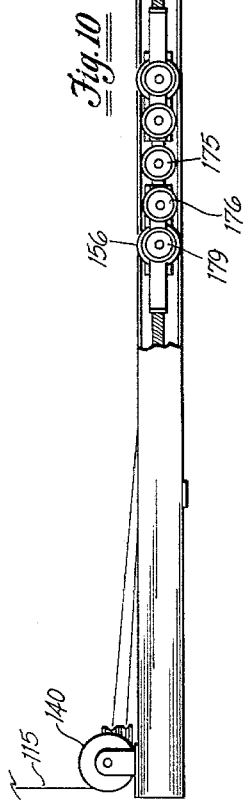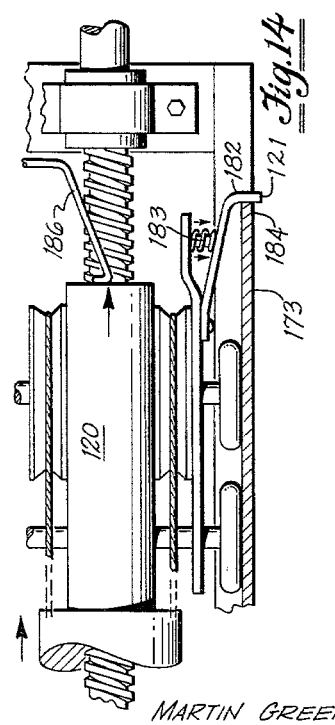

Feb. 22, 1966  M. GREEN  3,236,331
WORK BENCH, SCAFFOLD AND LIFT COMBINATION
Filed May 29, 1963  16 Sheets-Sheet 11
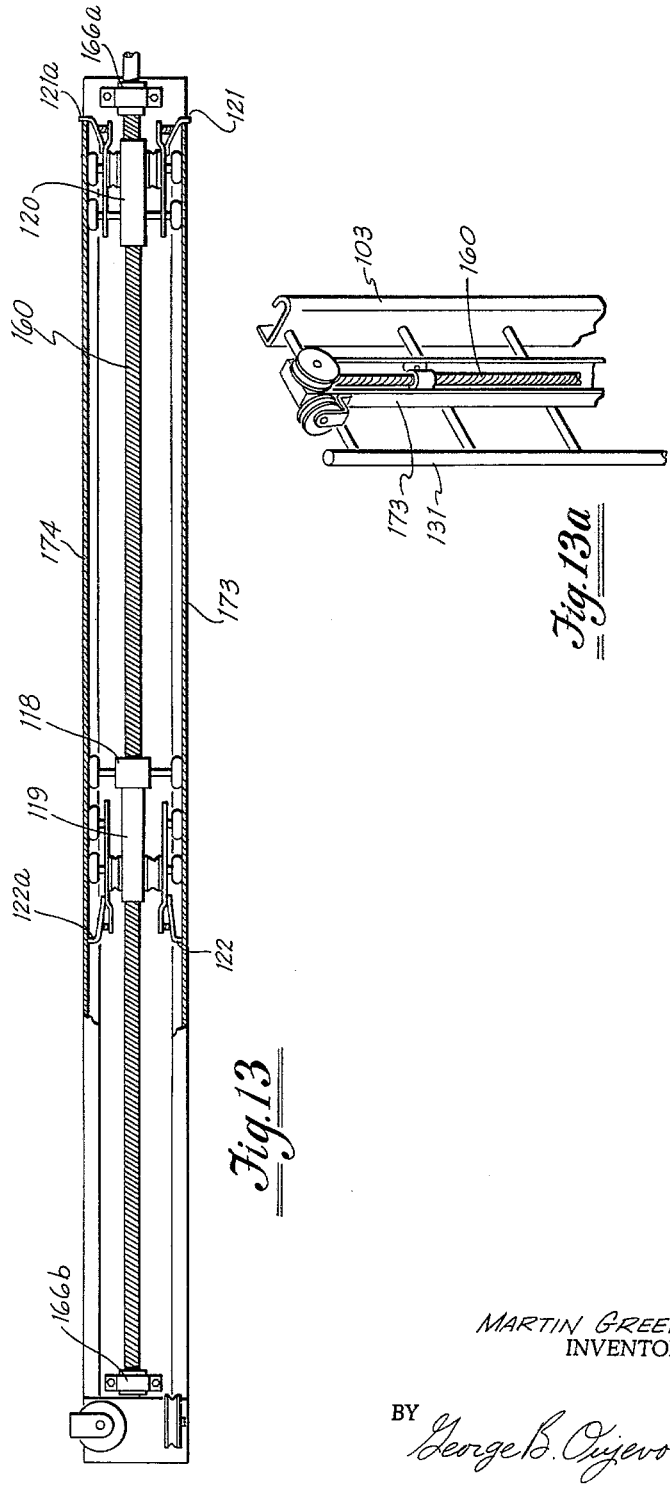
MARTIN GREEN
INVENTOR.
BY George B. Oujevolk
ATTORNEY Feb. 22, 1966     M. GREEN     3,236,331
WORK BENCH, SCAFFOLD AND LIFT COMBINATION
Filed May 29, 1963     16 Sheets-Sheet 12
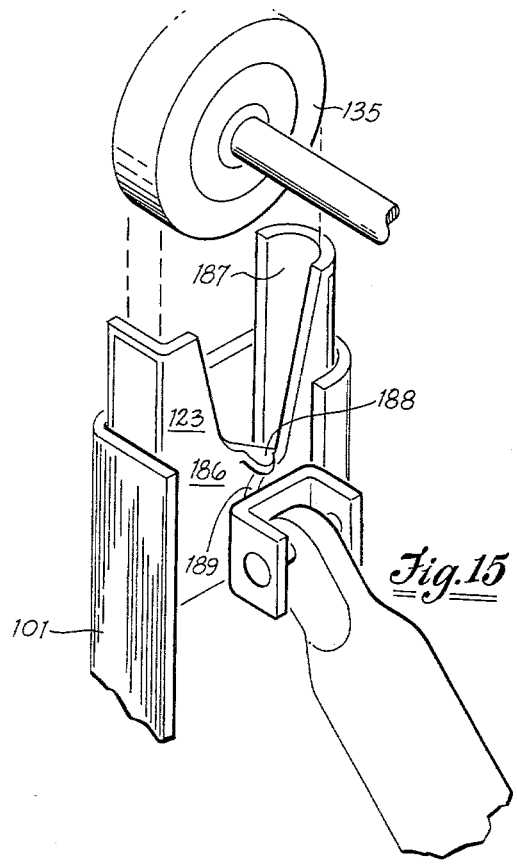
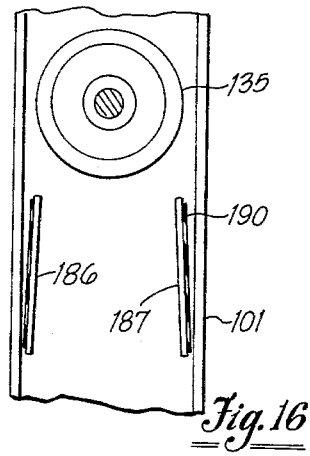
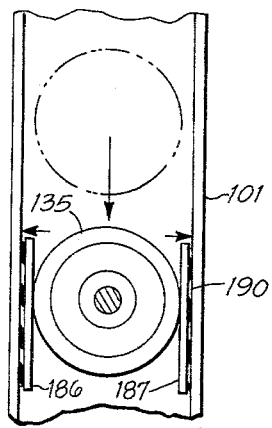
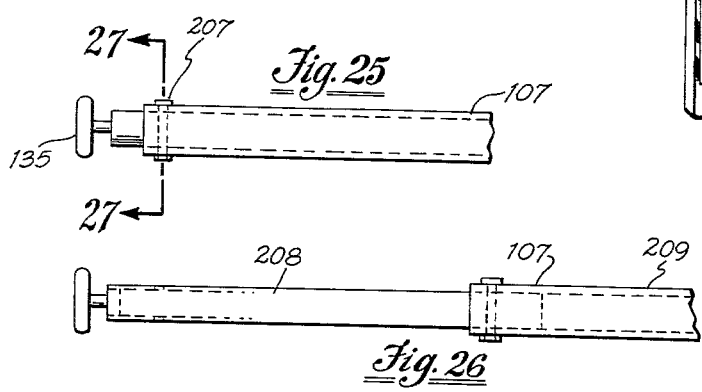
MARTIN GREEN
INVENTOR.
BY George B. Oujevolk
ATTORNEY Feb. 22, 1966        M. GREEN        3,236,331
WORK BENCH, SCAFFOLD AND LIFT COMBINATION
Filed May 29, 1963        16 Sheets-Sheet 13
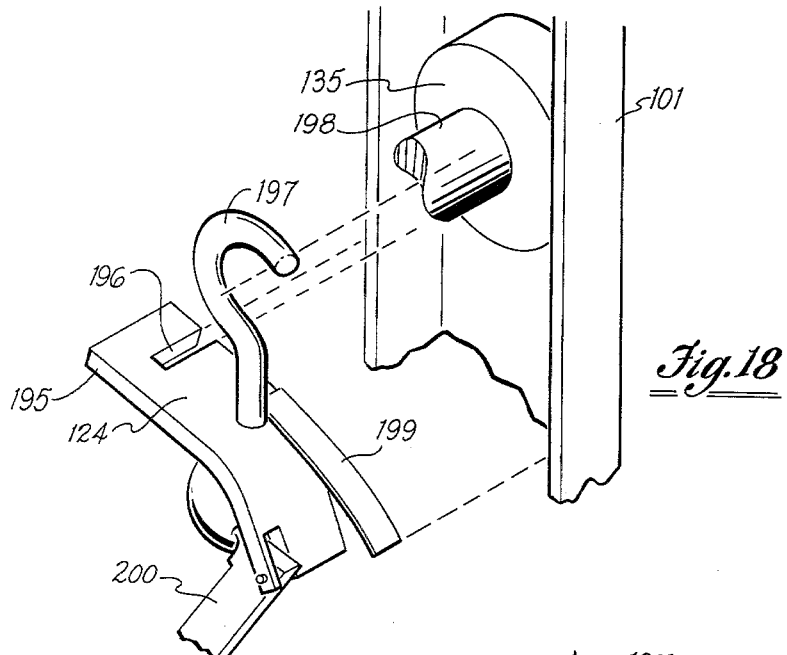
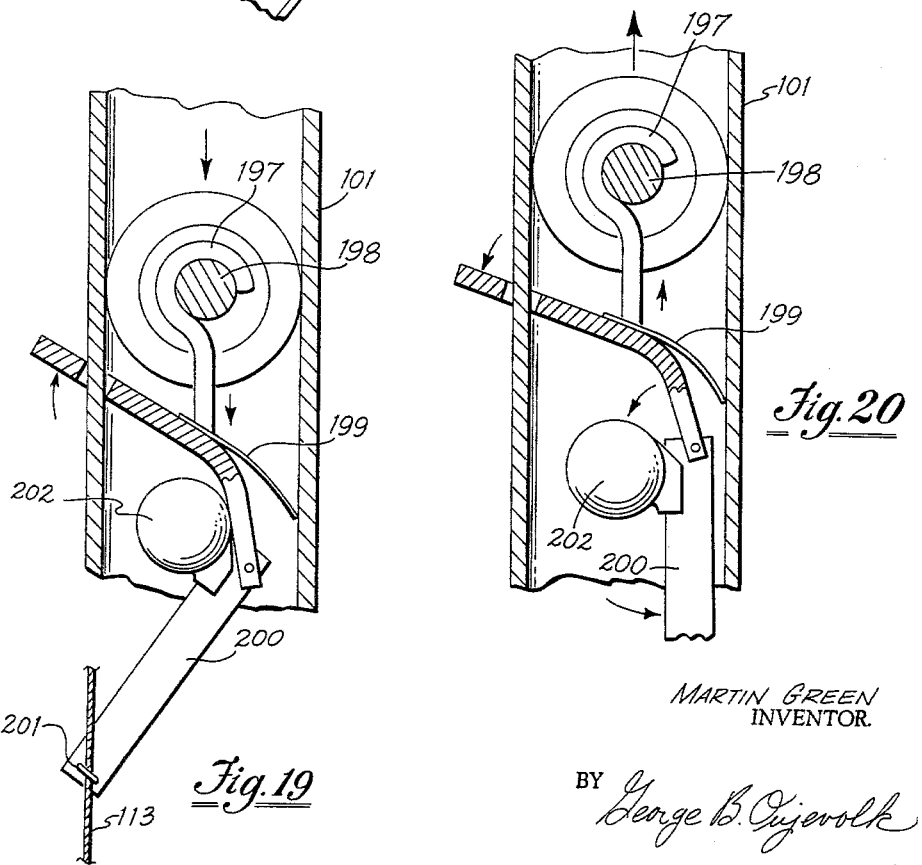
MARTIN GREEN
INVENTOR.
BY George B. Oujevolk
ATTORNEY

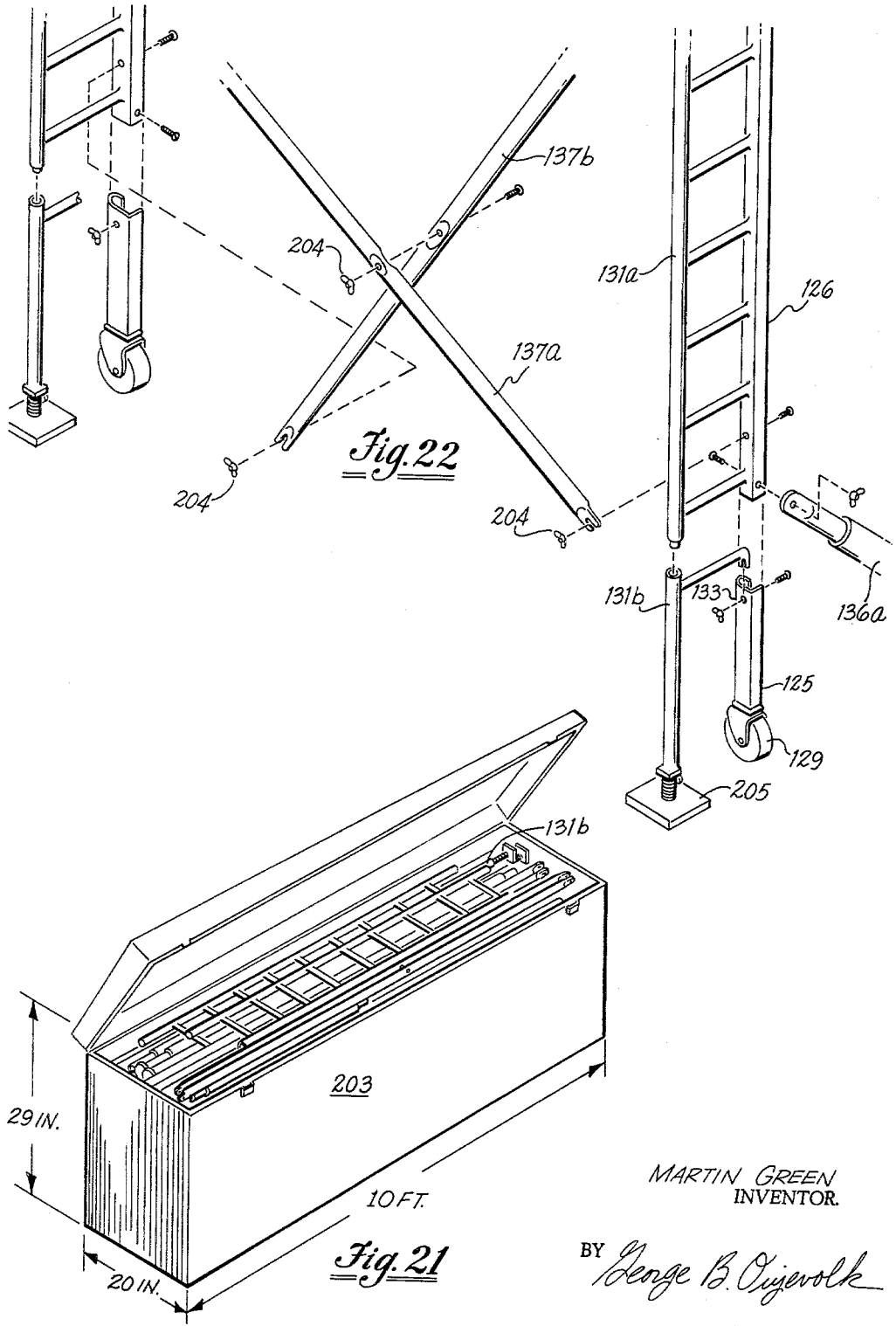

Feb. 22, 1966  M. GREEN  3,236,331
WORK BENCH, SCAFFOLD AND LIFT COMBINATION
Filed May 29, 1963  16 Sheets-Sheet 15
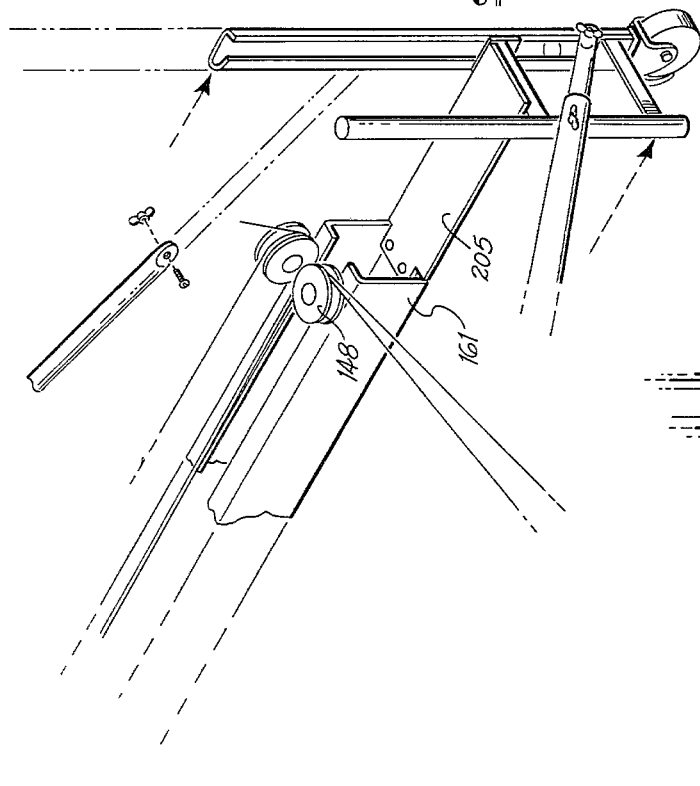
MARTIN GREEN
INVENTOR.
BY George B. Oujevolk
ATTORNEY Feb. 22, 1966  M. GREEN  3,236,331
WORK BENCH, SCAFFOLD AND LIFT COMBINATION
Filed May 29, 1963  16 Sheets-Sheet 16
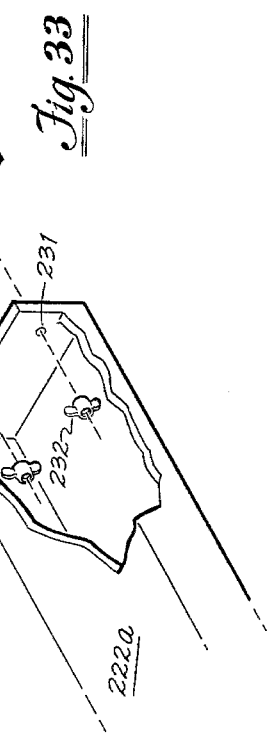
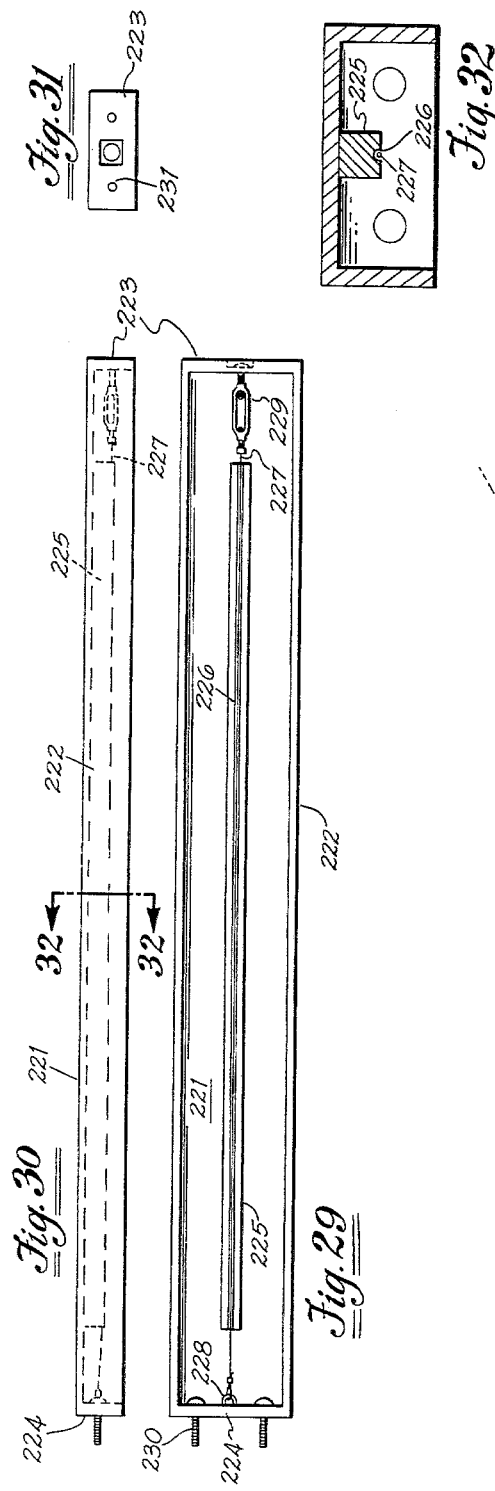
MARTIN GREEN
INVENTOR.
BY George B. Oujevolk
ATTORNEY United States Patent Office 3,236,331
Patented Feb. 22, 1966

3,236,331
WORK BENCH, SCAFFOLD AND
LIFT COMBINATION
Martin Green, Mahwah, N.J., assignor of one-half to
John Cornelia, Jr., Wayne, N.J.
Filed May 29, 1963, Ser. No. 284,127
8 Claims. (Cl. 182—144)

The present invention relates to a scaffold, and more particularly to a scaffold which has wide application in the construction of buildings, tunnels, painting, and other similar work projects where scaffolds are used.

The scaffolds of the prior art had no heavy lifting arrangement. The scaffold was built to a certain height and planks were extended over the top and a ladder was placed along the side. All assembling of pipes, ducts, bricks, mortar was done either at the shop or on the grounds in short lengths and manually lifted up to the necessary height ready for mounting. To lengthen or vertically extend the scaffold it was necessary to take apart and remove all material left on the scaffold and rebuild a new scaffold. Heretofore, scaffolds often had to be built for particular work projects and rarely included anything but a separate lift arrangement. Once built, it was often difficult to extend the scaffold. Also, a considerable amount of power was needed for lifting which often required special motors and winches to be transported to the place where the work was being performed. Although many attempts have been made to provide a universal scaffold applicable on almost any kind of work project, none, as far as I am aware has ever been successful when carried out into actual practice.

It has now been discovered that a universal scaffold can be provided which can be used on almost any kind of work project.

Therefore, it is an object of the present invention to provide a universal scaffold.

Another object of the present invention is to provide a scaffold which can be readily assembled and disassembled at the work site, and, can when disassembled readily fit into a small space such as the trunk of an ordinary passenger vehicle or the back of a station wagon.

Still another object of the present invention is to provide a light scaffold which can nevertheless lift tremendous weights to great heights, with a small motor, a small drill, or a hand crank.

A further object of the present invention is to provide a lifting means which will lift a platform to a certain height which is the usual limit of this lifting means and then double and even triple or quadruple this lifting distance by reversing the mechanism.

The invention also contemplates a novel work-bench or pallet of light construction but of tremendous strength.

Furthermore, the invention also contemplates a novel pallet which can be expanded or telescoped to several times its original dimension.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

In its broadest aspects, the invention contemplates a scaffold frame having one or more load lifting members disposed therein. A rotary screw drive is longitudinally or vertically disposed in the frame with a traveling drive boss. The lifting member is coupled to the drive boss by a cord and pulley arrangement and is raised and lowered as the drive boss travels longitudinally. The vertical travel of the lifting member can be extended by an additional traveling pulley in the cord and pulley arrangement which will travel along with the drive boss to one end of its travel path and stop means to hold the traveling pulley at said one end while the direction of travel of the drive boss is reversed. With one such traveling pulley, the vertical lifting distance is about doubled and with two such traveling pulleys, one on each side of the drive boss, the vertical lifting distance is about tripled. A special pallet is provided for sustaining a particularly heavy load on the lifting member.

The invention as well as other objects and advantages thereof will become apparent from the following description taken in conjunction with the accompanying drawing, in which:

FIGURE 2 is a front end view of the scaffold shown in FIGURE 1, but at a different time;

FIGURE 3 is a side view of the scaffold shown in FIGURE 1 at yet another time;

FIGURE 3a is a top view of the scaffold of FIGURE 3 along lines 3a—3a thereof;

FIGURE 5 is a cross-sectional view along the lines 5—5 of FIGURE 2;

FIGURE 5a is a cross-sectional view along the lines 5a—5a of FIGURE 2;

FIGURE 5b is a cross-sectional view along the lines 5b—5b of FIGURE 2;

FIGURE 6 is a cross-sectional view along the lines 6—6 of FIGURE 5;

Figure 1:
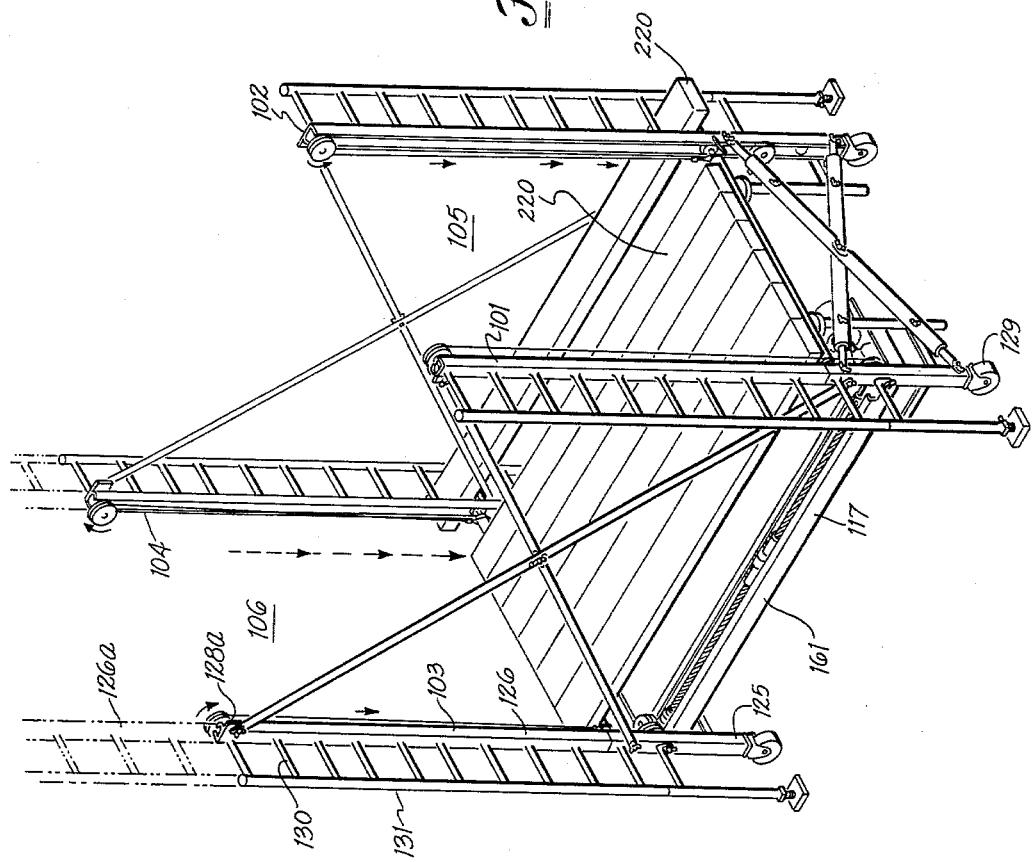
FIGURE 1 is a top perspective view of the scaffold herein contemplated when fully assembled.

FIGURE 7a to 7g schematically depict the extending of the vertical travel of a load being raised or lowered by the complex pulley arrangement contemplated herein;

FIGURE 8 is a side view of a theoretical portion of the apparatus herein contemplated with the complex pulley arrangement schematically shown in FIGS. 7a to 7g;

FIGURE 8a is a longitudinal perspective view of the complex pulley arrangement shown schematically in FIGS. 7a to 7g and theoretically illustrated in FIGURE 8;

FIGURE 8b is a sectional view along the lines 8b—8b of FIGURE 8a;

FIGURE 9 is a longitudinal top view of the drive means of the scaffold shown in FIGURE 1;

FIGURE 10 is a longitudinal side view of the drive means and the drive housing with a portion of the housing cut away to show detail;

FIGURE 11 is an end view of the drive means along lines 11—11 of FIGURE 10;

FIGURE 12 is a cross-sectional view of the drive means along lines 12—12 of FIGURE 9;

FIGURE 13 is a top view of the drive means similar to the view shown in FIGURE 9 but at a different time period of operation;

FIGURE 13a shows the drive means depicted in FIGURE 13 in the vertical position;

FIGURE 14 shows a top detailed view of an end portion of the drive means at an important time cycle during operation of the scaffold shown in FIGURE 1;

FIGURE 15 is a perspective view of one type of safety feature contemplated herein for the device shown in FIGURE 1;

FIGURE 16 is a frontal explanation of the safety feature shown in FIGURE 15 during normal safe travel;

FIGURE 17 is a frontal explanation similar to FIG-

Figure 28A:
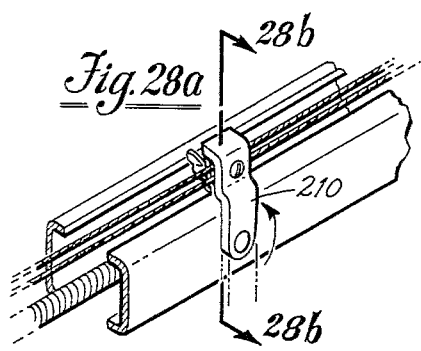
Figure 28B:
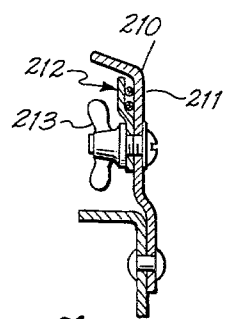

URE 16 but showing the safety feature in a position locked against downward fall should trouble develop in the apparatus;

FIGURE 18 is a perspective view of another type of safety feature contemplated herein for the device shown in FIGURE 1;

FIGURE 19 is a frontal explanation of the safety feature shown in FIGURE 18 in the stop safe position;

FIGURE 20 is a frontal explanation similar to FIGURE 19 but showing the safety feature during normal travel;

FIGURE 21 shows the device illustrated in FIGURE 1 unassembled and packed in its carrying box;

FIGURE 22 shows how the unassembled device is gradually assembled;

FIGURE 23 shows how the frame of a device shown in FIGURE 1 can be telescoped longitudinally;

FIGURE 24 shows the disposition of some of the components of the device illustrated in FIGURE 1 when the frame is telescoped;

FIGURE 25 depicts one of the telescoping lifting members;

FIGURE 26 illustrates how the lifting member shown in FIGURE 25 is telescoped;

FIGURE 27 is a cross-sectional view of the lifting member shown in FIGURE 25 along the lines 27—27 thereof;

FIGURE 28a depicts a cord clamp used in connection with the device shown in FIGURE 1;

FIGURE 28b is a cross-sectional view of the wire clamp shown in FIGURE 28a along the lines 28b—28b thereof;

FIGURE 29 provides a bottom view of a pallet contemplated herein;

FIGURE 30 gives a side view of the pallet shown in FIGURE 29;

FIGURE 31 is an end view of the pallet shown in FIGURE 30;

FIGURE 32 is a cross-sectional view of the pallet shown in FIGURE 30 along the lines 32—32 thereof; and, FIGURE 33 is a perspective view of the telescoping of the pallet shown in FIGURE 29.

GENERAL DESCRIPTION

The assemblable device 100 of the scaffold type shown in operation in FIGURE 1 and which will be herein described in greater detail, generally speaking has a frame defined by four vertical rail members 101, 102, 103 and 104. These rail members form front and rear tracks 105 and 106. Lifting is accomplished by a pair of lifting members 107 and 108 which are horizontally disposed in the frame and shown in FIGURE 4 without the frame. Each lifting member has two ends 109, 110, 111, 112 which can move vertically along the tracks. These lifting members are raised and lowered by means of a cable or cord and pulley arrangement, a simple version of which appears in FIGURE 4. The cord or cables 113, 114, 115 and 116 are coupled to the ends 109, 110, 111, 112 of the lifting members and, a longitudinal rotary screw drive means, i.e., drive assembly 117 moves the cords along the pulleys by means of a traveling drive boss 118. In the complex pulley arrangement herein contemplated and shown in FIGURES 8 and 8a two traveling pulley gangs 119 and 120 are disposed for free travel on both longitudinal sides of boss 118. Pulley stop means 121 and 122 are provided so as to stop the traveling pulley gangs at the longitudinal ends of the travel path of boss 118 along drive assembly 117. These stop means will retain the traveling pulleys at the longitudinal ends of the travel path. With only one traveling pulley gang, e.g., traveling pulley gang 119, the pulley cords can travel longitudinally about twice the length of the drive assembly and with two traveling pulley gangs 119 and 120, the distance that the cords can travel is about three times the length of the drive assembly. The direction of travel of drive boss 118 must be reversed each time a traveling pulley is stopped by one of the pulley stop means to increase the distance the cords can travel. To prevent the lifting means from dropping, especially with heavy loads, safety means are provided in the rail members 101, 102, 103, 104. Two different embodiments, 123 and 124 will be described herein and are shown in FIGURES 15 and 18. Safety switches are also provided in connection with the drive assembly. Although the drive assembly 117 is shown as being longitudinally disposed, it may of course be vertically disposed to cut down the length of the scaffold.

THE ASSEMBLED FRAME STRUCTURE

The four rail members 101, 102, 103, 104 each have a lower element 125 and an upper element 126. The lower elements 125 have a central leg portion 127 a joint portion 128 at one end and a caster portion 129 at the other end. The casters on these lower elements may, when desired, be fixed in position to prevent the scaffold from rolling. The joint portion 128 flanges out and can receive the corresponding upper element which will then rest solidly on the lower element forming a single rail. The upper element likewise has a joint portion 128a at one end thereof since the rails are intended to be lengthened when required. Thus, the joint portion 128a of upper elements 126 can each in turn receive another upper element 126a to heighten the scaffold. Extending out at right angles to these rail member elements are ladder rungs 130 terminating in a ladder side 131. These ladder sides forming part of the rail member upper elements and attached to the lower element likewise cooperate in the formation of an extended rail in the fastening arrangement. The ladder rungs 130 extend out from the frame whereas the rail members 101, 102, 103, 104 face inwardly. The rail members are hollow with a longitudinal aperture therein designed to retain wheels, e.g., wheel 135, see FIGURE 15, which is to travel along the rails. This wheel 135 forms part of the end of one of the lifting members. As better shown in FIGURES 5 and 6, the rails are so constructed that there are two straight portions at right angles to each other and a curved portion designed to partially encircle wheel 135.

Ladder side 131a of the upper element 126 will enter a similar flanged joint and be retained by a corresponding lower ladder side 131b for lower element 126 as shown in FIGURE 5a. The lower ladder side 131b of the ladder will be retained by a simple wing nut arrangement 133 shown in FIGURES 5b and 22. The rail members are maintained in place by telescoping end cross members, e.g., cross members 136a and 136b shown at one end, and identical cross members 136c and 136d at the other end of the frame. Similarly, there are lateral cross members 137a and 137b. For some types of work, shorter lateral cross members 138a, 138b may be used. Additional structural components will be described with assembling the device.

THE LIMITED DISTANCE PULLEY ARRANGEMENT (FIG. 4)

In this arrangement, the length of vertical travel of the lifting member 107 and 108 is limited by the longitudinal size of the frame, i.e., the distance between tracks 105 and 106 along which lifting members 107 and 108 are to travel. Although in this mode of operation the device has many uses, because of the advantage of the complex pulley arrangement later described in connection with extending the vertical travel distance, the device is preferably assembled with the complex pulley arrangement at the start of any project. Otherwise, to switch from one pulley arrangement to the other requires considerable disassembling of the scaffold. But, to better appreciate the complex pulley arrangement, an understanding of the simple pulley arrangement shown in FIGURE 4 is advantageous.

Figure 4:
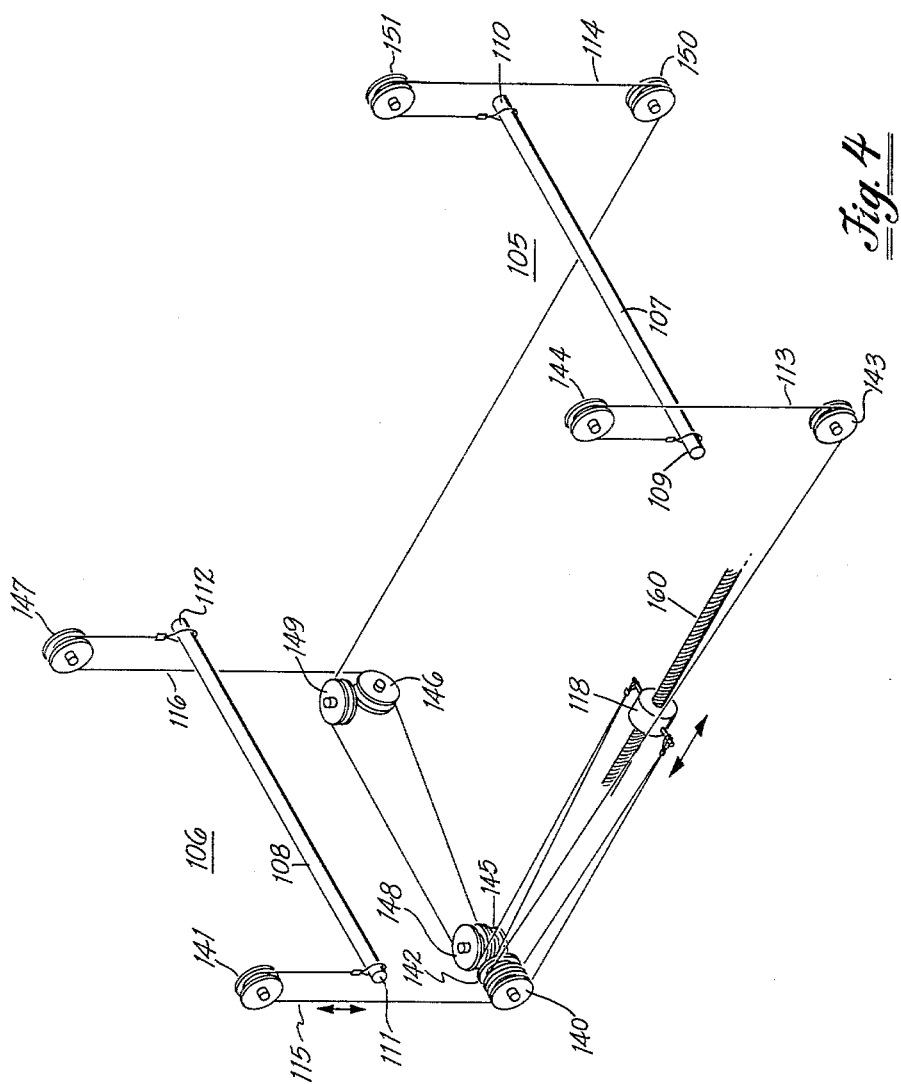
FIGURE 4 shows a limited distance simple pulley arrangement used in connection with the scaffold shown in FIGURE 1.

Lifting members 107 and 108 are shown in FIGURE 4 without either the frame, rails, or end wheels, it being of course readily apparent that the pulleys shown in this figure are affixed to the frame just described. Lifting members 107 and 108 which travel along tracks 105 and 106 are moved by means of four cables or wire cords 113, 114, 115, 116. Each cord is fastened to one end, 109, 110, 111, 112, of the lifting means and from there goes to a drive boss 118 over the pulley arrangement next described. Drive boss 118 moves horizontally along one side of the frame by means later described in connection with the drive means. For convenience, the longitudinal side along which drive boss 118 moves is referred to as the "one" side or the "near" side, and the other side is called the "other" side or the "far" side. Drive boss 118 extends laterally from the near side only a few inches out towards the far side of the frame. There is however, for convenience in terminology a near and a far side or the one and the other side of the drive boss. As seen in previous FIGURE 2, the drive means can be driven by a motor M, located at one end of the frame. For convenience, this end is referred to as the "front" end and the other end as the "rear" end. Therefore, lifting member 107 is located at the front end of the frame and lifting member 108 is located at the rear end of the frame. The wire cords therefore extend from the far side front and rear ends and the near side front and rear ends to the drive boss. Looking first at drive boss 118 near side, it is observed that cord 115 starts here, travels horizontally towards the rear end of the frame, goes around a lower vertical pulley 140 fastened to near rear rail member 103, changes its direction of travel 90° going vertically to the top of rail member 103 around upper pulley 141, changing its path 180° going down to the near end of rear lifting member 108 where it is firmly attached. Observing cord 113, this cord also starts at the near side of drive boss 118, moves horizontally towards the rear, goes through vertical pulley 142 disposed alongside pulley 140 but reverses its travel 180° going to the front end around vertical pulley 143 disposed on front near rail member 101, up to the top of rail member 101, around front pulley 144 and down to the near end of front lifting member 107. Cord 116 starts from the far side of drive boss 118, travels horizontally towards the rear to lower horizontal pulley 145, changes its path of travel 90° to the horizontal, goes to the far end of the frame to the far rear vertical pulley 146, changes its path of travel 90° to the vertical, goes up to the top of far rear rail member 104, 180° around pulley 147 at the top thereof and down to the far end of lifting member 108. Cord 114 starts at the far side of drive boss 118, travels horizontally to the rear end of the frame to horizontal pulley 148, changing its direction 90°, horizontally to the far rear end of the frame to horizontal pulley 149 again changing its direction by 90° to the far front vertical pulley 150, again changing directions 90° but this time to the top of far front rail member 114, around vertical pulley 151 changing its vertical travel 180° down to front lifting member 107. Assuming a longitudinal distance of seven feet between tracks 105 and 106, the lifting members can effectively lift seven feet by this pulley arrangement.

Summarizing therefore, in the limited distance pulley arrangement, when the drive boss is to travel longitudinally, there are first horizontal and vertical lower pulleys adjacent one end rail on one track, additional vertical lower pulleys adjacent each of the other three end rails at about the same horizontal level as said first lower pulleys, a second horizontal pulley adjacent the other end rail on this one track at about this same level, upper vertical pulleys towards the tops of said rail members, and four separate cords each extending from said drive boss to a different end of the lifting members traveling over these pulleys. When the drive boss is to travel vertically the pulleys are similarly disposed so as to direct the four cords to the four ends of the lifting members. Furthermore, all pulleys are idlers only. This reduces friction.

EXTENDING THE VERTICAL TRAVEL DISTANCE OF THE LOAD

As previously pointed out, the vertical travel distance of the simple cord and pulley arrangement described and shown in FIGURE 4 is limited by the longitudinal distance that the drive boss will travel. However, there is shown in the drawing how a load which is at its highest point in FIGURE 7a is lowered in FIGURE 7b to a first level in FIGURE 7c by the drive traveling in one horizontal direction. The direction of travel of the drive is then reversed and the drive travels back FIGURE 7d to its starting point in FIGURE 7e. The load however keeps going down. Again the drive is reversed in FIGURE 7f and the load goes still lower in FIGURE 7g. In this arrangement, three fixed pulleys and two traveling pulleys are used. The drive is numbered 118a similar to drive boss 118, the cord, 115a, similar to cord 115, and the fixed pulleys are numbered 140a, 141a and 141b, similar to the corresponding pulleys 140 and 141. The load is numbered 108a since this is similar to lifting member 108. The arrangement includes a rear traveling pulley 119a and a front traveling pulley 120a. In the first figure, the traveling pulleys are both held by stops at the front and rear and drive 118a has traveled horizontally the entire length of the device. As drive 118a moves towards rear traveling pulley 119a, the load 108a is lowered. Upon reaching traveling pulley 119a, the pulley is released from the stop and when the direction of travel of drive 118a is reversed and the drive travels towards the front end, traveling pulley 119a moves right along with the drive extending the downward direction of travel of load 108a for about a second full length. When the drive now comes to traveling pulley 120a, this pulley in turn is released from its stop. The direction of travel of the drive is again reversed as the drive 118a moves towards fixed pulley 140a. The downward travel of the load 108a continues for about a third full length. The upward travel of load 108a is of course precisely the reverse of what has just been described.

The foregoing arrangement is applied to the present invention in the theoretical explanation given in FIGURE 8. Here, the drive boss 118 is shown with one traveling pulley 119b to the rear and the other 120b to the front. Lower and upper rear near vertical pulleys 140 and 141 are also shown together with cord 115 going from the center boss around pulleys 119b, 120b, 140 and 141 to lifting member 108. This arrangement is then applied to all four cords in the concrete embodiment shown in FIGURES 8a and 8b. As will be subsequently explained, the drive boss 118 is designed to travel along a drive shaft. The drive boss 118 has near and far boss axles 154 and 155 extending horizontally transverse to the path of travel of center boss 118. Cords 113 and 115 are fastened to the near boss axle. Cords 114 and 116 should be fastened to far boss axle 155, but to facilitate the understanding of the invention, these cords are not shown in the view shown in FIGURE 8a. To the front and rear of drive boss 118 are rear traveling pulley gang 119 and front traveling pulley gang 120. Each gang consists of a cylindrical mount 119m and 120m and two sets of pulleys, 156, 156a and 157, 157a fastened laterally to an axel on each mount. Each pulley set can hold two cords, e.g., 113 and 115. The cords 113 and 115 starting from boss axle 154 go rearward over and around rear pulley set 156, horizontally frontwards to front pulley set 157 around and over pulley 157 and again rearwards. Cords 114 and 116 which are not shown in FIGURE 8a are disposed similar to cords 113 and 115 around pulleys 156a and 157a. As shown in FIGURE 8b, the boss 118 is threaded for travel along a drive shaft. Cylindrical mounts 119m and 120m are not threaded and are not coupled to the drive. They travel freely over the drive. Each pulley gang has stop means 121 and 122 which will be described in connection with the drive.

THE DRIVE

Looking first at FIGURES 1, 3, 3a, and 4, the drive assembly 117 is shown extending longitudinally across one side of the scaffold. The key feature of drive assembly 117 is a thin threaded drive shaft 160, shown mounted on the scaffold in FIGURE 3a. Drive boss 118 is threadedly mounted on drive shaft 160 as shown in FIGURE 8b. As will readily appear from a study of FIGURE 8a and 8b, the turning of drive shaft 160 with drive boss 118 mounted thereon acts like a nut on a screw. As the screw turns, if the nut is held in one orientation and the screw position is fixed, the nut must travel along the screw. The threaded drive shaft 160 shown mounted on the scaffold in FIGURE 3a is shown in a better and enlarged view in FIGURES 9 and 10 where the scaffold structure is omitted. The drive shaft 160 is lodged in a drive housing 161, likewise extending longitudinally along one side, i.e., the near side of the scaffold. At the front and rear end of drive housing 161 are shaft housings 162a and 162b. Shaft housings 162a and 162b, have lateral mounting ears 163a and 163b shown in FIGURE 11 depicting shaft housing 162a. These ears are for fastening the shaft housing to a base plate, front housing 162a being mounted on a front base plate 164a attached to the scaffold. There is also a rear base plate 164b for rear shaft housing 162b. Lugs 165 serve as the fastening means. Coupled to the shaft housing are inner front and rear thrust bearings 166a and 166b. The drive shaft 160 is mounted for free rotation between these inner front and rear thrust bearings. On the outer side of each shaft housing are outer front and rear thrust bearings 167a and 167b. The thrust bearings will act as a load absorber for drive shaft 160 and prevent buckling of the shaft when lifting a heavy load. Drive shaft 160 which is thus fixed in position between the front and rear shaft housings and the thrust bearings is turned by a gear drive which includes a worm gear 168, a driven pinion 169 and a coupling 170 for coupling the gear drive to the driven shaft by means of a coupling pin. Worm gear 168 in turn can be turned by either a removable hand crank 171 or a motor M including a motor coupling 172. As will be described later, worm gear 168 can likewise be driven by a hand drill and bit which will fit into the spot occupied hand crank 171. The orientation of the drive boss on the drive shaft is accomplished by means of drive rails 173 and 174. Again looking at FIGURES 8a and 9, it will be seen that drive housing 161 forms drive rails 173 and 174. Mounted on drive boss axles 154 and 155 are a pair of guide wheels 175. This drive boss guide wheels will be retained in the drive rails which have a hollow rectangular cross section. The orientation of the drive boss is therefore fixed by the boss axles and the guide wheels so that the drive shaft 160 will move the drive boss along the drive shaft by the screw drive action of the rotating drive shaft as the wheels roll along the rails. The direction of travel of the drive boss is determined by the direction of rotation of the drive shaft.

The traveling pulley gangs 119 and 120 likewise guide wheels, e.g., guide wheels 176 mounted on a mount axle 177. Since the traveling pulleys 156, 156a, 157, 157a are also mounted on axles, e.g., pulley axle 178, additional guide wheels, e.g., wheel 179 are also mounted on these pulley axles. It will be remembered however that the cylindrical mounts do not engage drive shaft 160 but travel over the drive shaft along rails 173 and 174.

Disposed on the two pulley axles between the pulley and the guide wheels are the pulley stop means 121 comprising a body portion 181 retained by the axels, a latch portion 182 extending out at an angle from the body portion like an inverted L, and a spring 183. The spring 183 urges the latch portion out so that it will engage the drive rail end 184. Once the latch portion has engaged end 184 of the drive rail end 184 it will remain latched unless manually dislodged. But, as shown in FIGURE 13, it can only be dislodged from the drive rail when the drive boss urges the traveling pulley gang towards the rail end. As shown in FIGURE 13 the operation schematically depicted in FIGURES 7a to 7g is accomplished by means of the complex pulley and the drive arrangement just described. With the pulleys as shown in FIGURE 8a and the drive boss towards pulley 140, the lifting members are at their lowest stage. Drive shaft 160 turns and the drive boss 118 travels away from pulley 140, the lifting members rise. Finally pulley stop means 121 and corresponding stop means 121a on the other side of gang 120 latch on to the end of the rails 173 and 174. Gang 120 stops and the rotation of motor M is reversed and the drive boss travels in the other direction where the stop means 122 and 122a on gang 119 will engage the other ends of rails 173 and 174. This will lift the lifting means to the second stage. By again reversing the motor, the lifting members are lifted to the third stage as the drive boss travels the length of the drive shaft. The drive assembly which is depicted as being horizontally disposed in FIGURE 1 may also be vertically disposed in the scaffold as shown in FIGURE 13a.

SAFETY

Since the scaffold is built to lift heavy loads, by the three stage operation just described, it is essential that there be no difficulty during the reversal of direction of the drive boss. Furthermore, the lifting members must be locked against free fall in the event that something unforseen should happen.

Figure 2A:
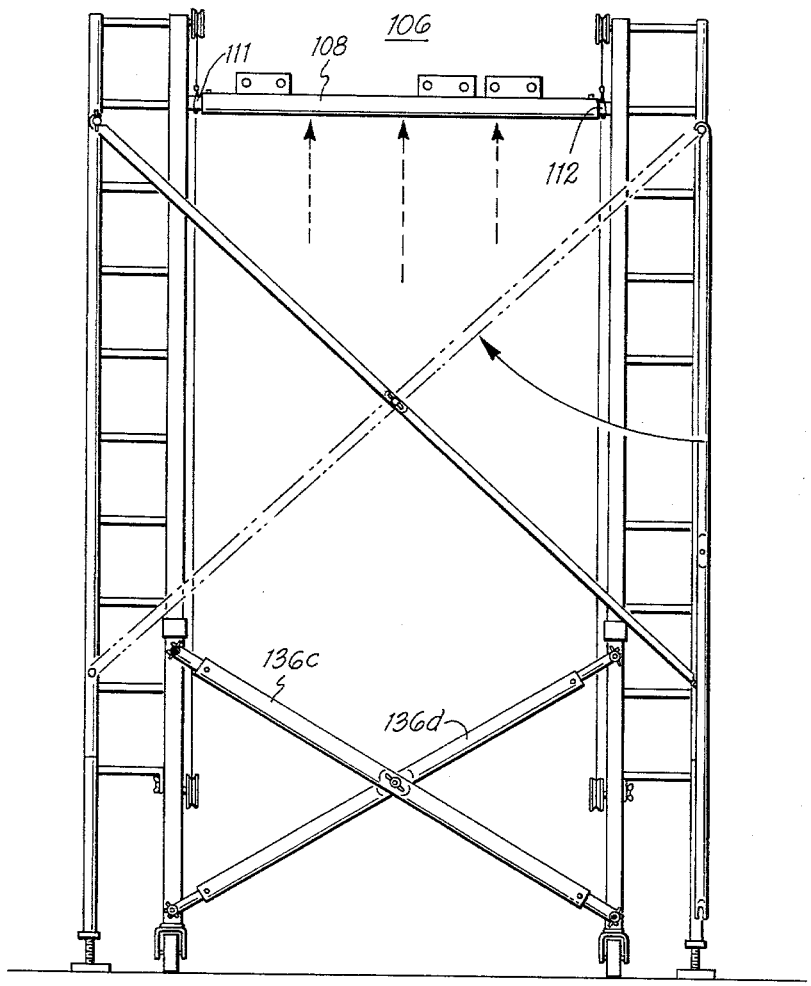
FIGURE 2a is a rear end view of the scaffold shown in FIGURE 1, at still another time.

At both ends of the drive shaft is a trip switch 186 which is connectable to the motor circuit when a motor is used to turn the drive shaft. This trip switch can be so connected as to either stop or reverse the motor when tripped. In practice it is advisable to stop the motor and for the operator to manually control the entire motor operation with a hold switch. To lock the device against free fall, two different types of safety means are contemplated. The first safety means 123 is illustrated in FIGURES 15, 16 and 17 and also shown in FIGURE 2. This first safety means generally comprises a first truncated right triangular member 186 with a straight wing, a second truncated right triangular member 187 with a curved wing, both first and second members being joined at the acute angle, the members being so fixed that the wings will fit in one end rail member 101 as shown in FIGURE 15. The thickness of the wings may increase very slightly from top to bottom. As shown in FIGURE 16, as long as the wheel 135 of the lifting member is moving upwards and is free of the safety, the wheel can travel. However, should the wheel fall, it will fall into the safety between the wings and wedge the wings against the rail as shown in FIGURE 17. The diameter of the wheel and the disposition of the wings is such that the wheel cannot get past the wings 186 and 187. One of the truncated triangular members, e.g., 186 has an overlapping tongue 188 which overlaps to some extent over the joint of the two members and the other member has a rounded joint portion 189 disposed under the tongue. The members are joined by a pin so that the wings can swing to and away from the sides of the rail in a scissor movement. Advantageously a spring can be inserted between the wings to tend to keep them against the rail inner sides. A pull on the round joint portion 189 will act on the tongue 188 forcing the wings against the inner sides of the rail, as shown in FIGURE 16. As long as the wheel 135 of the lifting member is moving upwards or as long as the wings are manually kept scissored outwards against the rail inner side, wheel 135 can move. However, should the wheel drop, it will enter the safety means and here, it cannot possibly get past the joint of the two members since at this point it will merely wedge the wings against the rail. A rubber padding 190 is provided on the outer side of the wings to prevent damage and friction heat. Fastened to the safety means is a U-shaped safety coupling 191 with a pin coupling a safety support rod 192 to the safety means. When the lifting members are in place, the safety rod 192 is locked across the the opposite rail on the same track as illustrated in FIGURE 2. Also, the safety rod is used to manually move round joint portion 188 against tongue 187 to allow the lifting members to descend without wheel 135 entering the safety. However, the wheel is still within less than one-half inch from the mouth of the safety means and should anything happen, the wheel will enter the safety means immediately jamming the wings of the safety means against the inner sides of the rail. When the scaffold is in use, and safety rod 192 is locked across to the opposite rail, the scaffold cannot descend.

Second safety means 124 is shown in FIGURES 18, 19 and 20, and comprises a bent rectangular member 195 with one long and one short arm. This bent member is somewhat longer than the width of one of the rails and has a slot 196 in the long arm to permit a portion of this bent member to enter the rail. The arms of the member inside the rail are about equal with the extra part of the longer arm outside the rail on the other side of the slot. At the bend in the bent member is a hook 197 for fastening to the wheel axle 198 of the lifting member. On the same side as the slot extending over the shorter arm from the longer arm is a resilient extension 199 which will tend to keep the short arm away from the inner side of the rail. Pivotly coupled to the end of the short arm on the side opposite to the slot is an elongated cross piece 200. The other end of cross piece 200 has a small clip 201 to clip on to the pulley cord 113. Opposite the pivot point where elongated cross piece 200 is coupled to the short arm of member 195 is a ball weight 202 tending to pull the cross piece away from the pulley cord. While the safety clip is on the pulley cord, the wheel 135 can move up or down. In order for the wheel, and the lifting member to move, the safety clip 201 must be on the cord. This is because of the narrow size of the slot 196. In order for the safety means to travel along the slot, the long arm must be held in the proper orientation and the short arm kept away from the rail sides by resilient extension 199. Should the wheel 135 drop, the safety means will be immediately jammed against the rail side and stop the downward travel of the wheel. This safety means requires hardened steel edges so that the safety means does not bend under the impact of a heavy load.

ASSEMBLING THE SCAFFOLD
(FIGS. 21, 22, 23, 24, 25, 26, 27, 28a, 28b)

The scaffold just described is preferably marketed in a special box 203 which serves as the carrying box for the knocked-down scaffold and is shown in FIGURE 21. The box shown is 10 feet long by 20 inches wide and 29 inches high and will readily fit into a station wagon. It has numerous compartments to hold the various individual pieces and components which when assembled will provide the scaffold of FIGURE 1. The box is so designed that the components and pieces first required during assembly are in the top compartments while those required later are in the middle and bottom compartments. Thus, the first component required will be lower ladder sides 131b shown at the top of the box. With these pieces are required the upper ladder sides and rail member elements 131a, 126. Afterwards the lower rail member elements, 125, cross members 136a, 136b, 136c, 136d, lateral cross members 137a, etc., wing nuts 204 etc. The rail members when assembled are held level on uneven ground by means of an adjustable foot 205 on lower ladder side 131b. The scaffold may be extended longitudinally and in width as shown in FIGURES 23 and 24. An extension plate 205 can be added between the drive housing 161 and the frame. This extension plate 205 will change the travel angle of the pulley cords somewhat but otherwise the device operates as described. Lifting members 107 and 108 can also be telescoped to increase the width of the scaffold as shown in FIGURES 25, 26 and 27 using a set bolt 207.

Each lifting member has two telescoping cylinders 208, 209 which are set in position by the set bolt. When moving or disassembling the scaffold, care must be taken so that the pulley cords do not foul. To prevent this, a pulley cord set means 210 are provided. Set means 210 are pivoted to the drive rails and also to the end rail members on the outside thereof and includes an inverted L-shaped cord housing 211 with a cord clamp 212 in the housing and a wing nut 213 to hold the clamp against the housing. With a little practice and with several workmen assembling the scaffold, the assembly or disassembly is accomplished in minutes time. The pulley cords are fastened to the lifting members by means of hooks. All end rail members lifting members, lifting member ends hooks, etc., are numbered, e.g., 1, 2, 3, 4 and when assembling the scaffold the workmen know exactly which pieces connect to other pieces because of the numbers.

THE PALLET (FIGS. 29, 30, 31, 32, 33)

The pallet 220 used with the scaffold just described is designed to hold tremendous loads and be extended longitudinally. The pallet is rather narrow and a plurality of pallets are disposed across the lifting members. Also, the pallet will fit across the ladder rungs along the sides of the scaffold. The pallet has an open elongated rectangular box-like configuration and comprises a top 221, side walls 222, and front and rear end walls 223 and 224. Inside the box-like structure, along the center of the top, parallel to the side walls 222 is a reinforcing wall 225 with a groove 226 at the bottom. Extending between the front and rear walls 223 and 224 is a reinforcing wire 227 which passes in groove 226. Reinforcing wire 227 is firmly held at the rear end of the pallet by a U-grip 228 fastened to rear wall 224. The wire is held to the front wall 223 by threaded wire tightening means 229. This is the conventional manner of using the pallet without telescoping. However, as best illustrated in FIGURE 33, the pallet has outwardly extending bolts 230 at the rear end, and apertures 231 at the front end for receiving these bolts. When the bolts 230 on one pallet 222 are fitted into the corresponding apertures 231 on another pallet 222a and fastened by wing nuts 232, a solid telescoped pallet of double the pallet length is thereby obtained. There is thereby provided a pallet for use with the scaffold between the lifting members which comprises an elongated box like structure having two longitudinal side walls, two shorter end walls and a top. A reinforcing wall extends between and parallel to said side walls along the center of said top. Wire retaining and wire tightening means are provided on the end walls towards the top center thereof designed to retain a reinforcing wire extending between the end walls along the reinforcing wall. The pallet includes extensions on one end wall and extension receiving apertures in the other end wall. Fastening means are provided to fasten the end extensions of one pallet to another pallet when said extensions extend through the receiving apertures of the other pallet. Therefore, with the pallet contemplated therein, a third plank at the junction points of two planks is eliminated and the pallet can be extended without additional reinforcing planks.

OPERATION

The particular advantage of the scaffold described herein is the small power required to lift a heavy load. This is important on work projects which are far from power lines. Winches require large power supplies for their operation, whereas with the present scaffold, a two ton load can be lifted with the hand crank or a hand drill.

Also, for work in projects like mines, tunnels and mountain tops, the unassembled device can be carried to the work site and be rapidly assembled in a small area. The safety means described will meet the approval of government and union safety agencies. Although described principally with a lifting operation, as shown in FIGURES 7a to 7g the device can also be used with a lowering operation. The present invention combines a work bench, scaffold and lift as one combination. As a work bench it is brought to the project site for the purpose of assembling parts of long lengths such as sprinkler pipes, heating duct works, gutters, and building materials of every description without removing the assembled solder or welded work complete for installation and fastening in the proper position. The workpieces are hoisted without removing from the bench. The work bench, scaffold and lift can accommodate wide and long materials and raise them to the exact location of installation. To accommodate extra long or wide workpieces the work bench, scaffold and lift combination can be widened and lengthened through the telescopic cross-members, and extending the cross braces. With the workbench, the workshop is brought to the work site.

As best shown in FIGURE 13a, it is sometimes necessary to have a vertically disposed drive when working in cramped quarters. Except for the fact that this eliminates one of the side ladders from use by workmen, this arrangement poses no particular problems. The pulleys can be disposed towards the top of the scaffold rather than towards the bottom if the scaffold is to be motor driven. However, in places where there is no power available, the drive shaft may be turned by a hand crank which can be placed either at the top or bottom of the drive shaft.

It is to be observed therefore that the present invention provides for a scaffold having four vertical rail members forming front and rear tracks defining a frame. A pair of lifting members are horizontally disposed so that the ends thereof can move vertically along the track. The raising and lowering of the lifting members along these vertical tracks is accomplished by means of a cable or cord and pulley arrangement, the cable or cords of which are coupled to the ends of the lifting members, and a rotary screw drive means which has a traveling drive boss to which the cords are connected. The vertical travel of the lifting members can be extended by additional traveling pulleys in the cord and pulley arrangement which are disposed on the one and the other side of the drive boss and which will travel along with the drive boss to the one and the other end of its travel path and stop adjust means to hold the traveling pulleys at said one and the other end while the direction of travel of the drive boss is reversed. With one such traveling pulley, the vertical lifting distance is about doubled, with two such traveling pulleys, this distance is about tripled. To sustain extra heavy loads, special pallets are disposed across the lifting members. The drive means illustrated in FIGURE 1 as being longitudinally disposed may also be vertically disposed as shown in FIGURE 13a.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A scaffold, comprising in combination, four vertical rail members forming front and rear tracks defining the ends of a rectangular frame; a pair of horizontally disposed lifting members each with the ends thereof designed to move vertically along the tracks; longitudinal rotary screw drive means including a longitudinal screw drive shaft extending horizontally along the one side of said frame, a drive boss being threadedly mounted thereon, the traveling of said drive boss being accomplished by turning of said shaft, turning means to turn said shaft and, a cord and pulley arrangement, the cords of which are coupled to the ends of the lifting members and to said traveling drive boss, said cord and pulley arrangement including first horizontal and vertical lower pulleys adjacent one end rail on one track, additional vertical lower pulleys adjacent each of the other three end rails at about the same horizontal level as said first lower pulleys, a second horizontal pulley adjacent the other end rail on said one track at about said same level, upper vertical pulleys towards the tops of said rail members, and, four separate cords each extending from said drive boss to a different end of said lifting members, traveling over said pulleys.

2. A device as claimed in claim 1, including at least one longitudinal traveling pulley disposed for free travel along said shaft, and, pulley stop means for holding said traveling pulley as it reaches one end of said shaft said cords passing through said pulley so that the distance said cords can travel longitudinally along said shaft is about twice the length of said shaft.

3. A device as claimed in claim 2, said traveling pulley being disposed for free travel along said shaft on one longitudinal side of said boss, being another pulley similarly disposed on the other side of said boss.

4. In a lifting device for lifting heavy loads with little power, in combination, rectangular frame including vertical guide means; a lifting member designed to move vertically therealong; horizontally disposed rotary screw drive means including, a thin drive screw extending longitudinally along said frame at one side thereof; screw housing means mounted on said frame on said one side for maintaining the ends of said drive screw for free rotation; gear means at one end of said drive screw, the turning of said gear means causing said drive screw to turn, said gear means including a worm gear and turning means to turn said worm gear, a cord and pulley arrangement coupled to said lifting member to move said lifting member up and down, said cord and pulley arrangement including first horizontal and vertical lower pulleys adjacent one corner of said frame towards the bottom portion thereof; additional vertical lower pulleys adjacent each of the other three corners at about the same horizontal level as said first lower pulleys, a second horizontal pulley laterally opposite said first lower pulleys at about said same level, upper vertical pulleys towards the top of said frame at each of the four corners thereof; and, four separate cords forming the cords of said cord and pulley arrangement extending from said drive boss to a different end of said lifting member, traveling over said pulleys.

5. A device as claimed in claim 4, including at least one longitudinal traveling pulley disposed for free travel along said shaft, and, pulley stop means for holding said pulley at one end of said shaft when it reaches said end, said cords passing through said pulley so that the distance said cords can travel longitudinally along said shaft is about twice the length of said shaft.

6. A plurality of knocked-down components assemblable to form a scaffold including upper and lower members which when assembled will form four vertical rail members to form front and rear tracks defining the ends of a rectangular frame, said lower member including an outwardly flanged joint at one end and a caster at the other end, the upper member fitting into said joint to form a continuous rail with said lower member, said upper member likewise having a flanged joint at one end to receive another like upper member therein, said formed rail being an elongated hollow body with a longtiudinal opening therein for holding a rolling wheel;

at least four pair of telescoping cross members to hold said rail members in place said cross members defining the sides, the front and rear of said frame;

an extended screw drive shaft designed to be disposed of said frame including fastening means to fasten said screw drive shaft thereto;

a threaded drive boss designed to be mounted on said screw drive shaft including cord retaining means;

at least one traveling pulley and sheath combination, said traveling pulley being designed to travel with said drive boss, said sheath being designed to at least partially encircle said screw drive shaft and ride over it, with at least one wheel on said sheath and a latch thereon, a drive track about the same size as said screw drive shaft designed to be disposed therealongside, said sheath and one wheel being designed to move along said drive track;

a set of cords and pulleys; and a pair of lifting members having wheels at the ends thereof designed to travel along said vertical rail members, said set of cords and pulleys serving to couple the drive boss to said lifting members.

7. A scaffold, comprising in combination, a frame including four vertical rail members forming front and rear tracks defining a rectangular frame, a pair of horizontally disposed lifting members, each with the ends thereof designed to move vertically along the tracks; a rotary screw drive means vertically disposed in said frame alongside one of said tracks including a traveling drive boss, four cords coupled to said drive boss going to each of said ends of the horizontal lifting members, and pulleys disposed in said frame so arranged as to lead said four cords to said ends of the horizontal lifting members, and, at least one traveling pulley disposed for free travel along said shaft, and, pulley stop means for holding said pulley at one end of said shaft when it reaches said end, said cords passing through said pulley so that the distance said cords can travel along said shaft is about twice the length of said shaft.

8. A device as claimed in claim 7 said traveling pulley being disposed for free travel along said shaft on one side of said boss, there being another pulley similarly disposed on the other side of said boss, and pulley stop means for holding said traveling pulleys at both ends of said shaft, said cords passing through said pulleys so that the distance said cords can travel with said boss along said shaft is about three times the length of said shaft.

References Cited by the Examiner

UNITED STATES PATENTS

| 344,734 | 6/1886 | Goudie | 182—143 |
|---|---|---|---|
| 530,389 | 12/1894 | Brooks | 182—144 X |
| 537,631 | 4/1895 | Cooper | 182—143 |
| 771,878 | 10/1904 | Laughlin | 182—145 X |
| 1,801,904 | 4/1931 | Davidson | 182—222 |
| 1,879,376 | 9/1932 | McMinn | 182—145 |
| 1,958,424 | 5/1934 | Gebhard | 74—424.8 |
| 2,415,461 | 2/1947 | Causey | 182—222 |
| 2,588,959 | 3/1952 | Campbell | 182—103 X |
| 2,756,950 | 7/1956 | Greenough | 74—424.8 |

REINALDO P. MACHADO, *Primary Examiner.*